United States Patent
Thyamagondlu et al.

(10) Patent No.: US 10,657,084 B1
(45) Date of Patent: May 19, 2020

(54) INTERRUPT MODERATION AND AGGREGATION CIRCUITRY

(71) Applicant: Xilinx, Inc., San Jose, CA (US)

(72) Inventors: Chandrasekhar S. Thyamagondlu, Sunnyvale, CA (US); Darren Jue, Sunnyvale, CA (US); Tao Yu, Santa Clara, CA (US); Kushagra Sharma, Santa Clara, CA (US); Tuan Van-Dinh, Palo Alto, CA (US)

(73) Assignee: Xilinx, Inc., San Jose, CA (US)

( * ) Notice: Subject to any disclaimer, the term of this patent is extended or adjusted under 35 U.S.C. 154(b) by 0 days.

(21) Appl. No.: 16/183,646

(22) Filed: Nov. 7, 2018

(51) Int. Cl.
*G06F 13/24* (2006.01)
*G06F 13/28* (2006.01)

(52) U.S. Cl.
CPC .............. *G06F 13/24* (2013.01); *G06F 13/28* (2013.01)

(58) Field of Classification Search
CPC ........... G06F 13/24; G06F 13/28; G06F 13/32
See application file for complete search history.

(56) References Cited

U.S. PATENT DOCUMENTS

| | | | |
|---|---|---|---|
| 9,547,598 B1 * | 1/2017 | Karnowski | G06F 3/0688 |
| 2008/0155154 A1 * | 6/2008 | Kenan | G06F 9/4812 |
| | | | 710/263 |
| 2011/0093637 A1 * | 4/2011 | Gupta | G06F 9/4812 |
| | | | 710/263 |
| 2014/0006667 A1 * | 1/2014 | Sun | G06F 13/24 |
| | | | 710/261 |
| 2014/0281087 A1 * | 9/2014 | Talpey | G06F 13/24 |
| | | | 710/263 |
| 2015/0089101 A1 * | 3/2015 | Tsirkin | G06F 13/24 |
| | | | 710/262 |
| 2015/0286594 A1 * | 10/2015 | Degani | G06F 13/24 |
| | | | 710/261 |
| 2017/0344277 A1 * | 11/2017 | Gilboa | G06F 13/24 |

* cited by examiner

*Primary Examiner* — Tim T Vo
*Assistant Examiner* — Phong H Dang
(74) *Attorney, Agent, or Firm* — Crawford Maunu PLLC

(57) ABSTRACT

A memory circuit is configured for storage of completion queues. Each completion queue can store completion descriptors associated with transfers of data from interrupt source circuits to the memory circuit. A direct memory access circuit provides access to the memory circuit for the interrupt source circuits. An interrupt engine issues interrupt messages for processing the completion descriptors in the completion queues in response to satisfaction of a set of trigger conditions specified in an active interrupt moderation mode. The active interrupt moderation mode is one of multiple available interrupt moderation modes. The interrupt engine bypasses issuing interrupt messages in response to the set of trigger conditions of the active interrupt moderation mode not being satisfied.

18 Claims, 10 Drawing Sheets

INTERRUPT MODERATION AND AGGREGATION CIRCUITRY

TECHNICAL FIELD

The disclosure generally relates to circuits that manage message-based interrupts.

BACKGROUND

In networked applications, each completion of a job involving DMA reads from or writes to host memory through a communications link can be communicated back to the host processor through an interrupt. In many applications, such as para-virtualization, taking interrupts on all processor cores may be undesirable in order to preserve the quality of service (QOS) for virtual machines executing on the processor cores. In those applications a dedicated processor for a hypervisor could take the interrupt and schedule the job to a virtual machine without affecting the QOS.

In certain environments, the operating system may be unable to provide many interrupt vectors and yet need to use many queues to distribute the traffic to available CPU cores. Some networking protocols, such as remote direct memory access (RDMA), require many queues (typically more than 64K queues) for point to point communication in applications such as high-performance computing (HPC), cloud storage etc. to reduce latency. Most implementations poll the queues by software, but implementations use asynchronous notification, which requires interrupts. In para-virtualization each virtual core (vCore) can have dedicated queues for sending and receiving packets. However, for QoS a hypervisor may take interrupts on fewer CPU cores or threads and distribute the processing to vCores. Events and interrupts can be aggregated to reduce the number of interrupt vectors.

Interrupt moderation is a technique by which the issuing of interrupts to a host processor is managed in order to avoid overloading the host processor. Moderating interrupts issued as a result of network communications may adversely affect the processing of interrupts from other types of applications. However, without sufficient moderation of interrupts resulting from network communications, the performance of other types of applications may still suffer as a result of barrages of network-triggered interrupts.

SUMMARY

A disclosed system includes a memory circuit, a direct memory access circuit, and an interrupt engine. The memory circuit is configured to store a plurality of completion queues. Each completion queue has storage for a plurality of completion descriptors associated with transfers of data from a plurality of interrupt source circuits to the memory circuit. The DMA circuit is coupled to the memory circuit and is configured to provide access to the memory circuit for the plurality of interrupt source circuits. The interrupt engine is coupled to the memory circuit and is configured to issue interrupt messages for processing the completion descriptors in the completion queues in response to satisfaction of a set of trigger conditions specified in an active interrupt moderation mode. The active interrupt moderation mode is one of a plurality of available interrupt moderation modes. The interrupt engine bypasses issuing interrupt messages in response to the set of trigger conditions of the active interrupt moderation mode not being satisfied.

A disclosed method includes storing a plurality of completion queues in a memory circuit. Each completion queue has storage for a plurality of completion descriptors associated with transfers of data from a plurality of interrupt source circuits to the memory circuit. A direct memory access (DMA) circuit provides access to the memory circuit for the plurality of interrupt source circuits. The method includes issuing interrupt messages by an interrupt engine to a host system for processing the completion descriptors in the completion queues in response to satisfaction of a set of trigger conditions specified in an active interrupt moderation mode. The active interrupt moderation mode is one of a plurality of available interrupt moderation modes. The interrupt engine bypasses issuing interrupt messages by the interrupt engine in response to the set of trigger conditions of the active interrupt moderation mode not being satisfied.

Other features will be recognized from consideration of the Detailed Description and Claims, which follow.

BRIEF DESCRIPTION OF THE DRAWINGS

Various aspects and features of the circuits and methods will become apparent upon review of the following detailed description and upon reference to the drawings in which.

DETAILED DESCRIPTION

Figure 1:
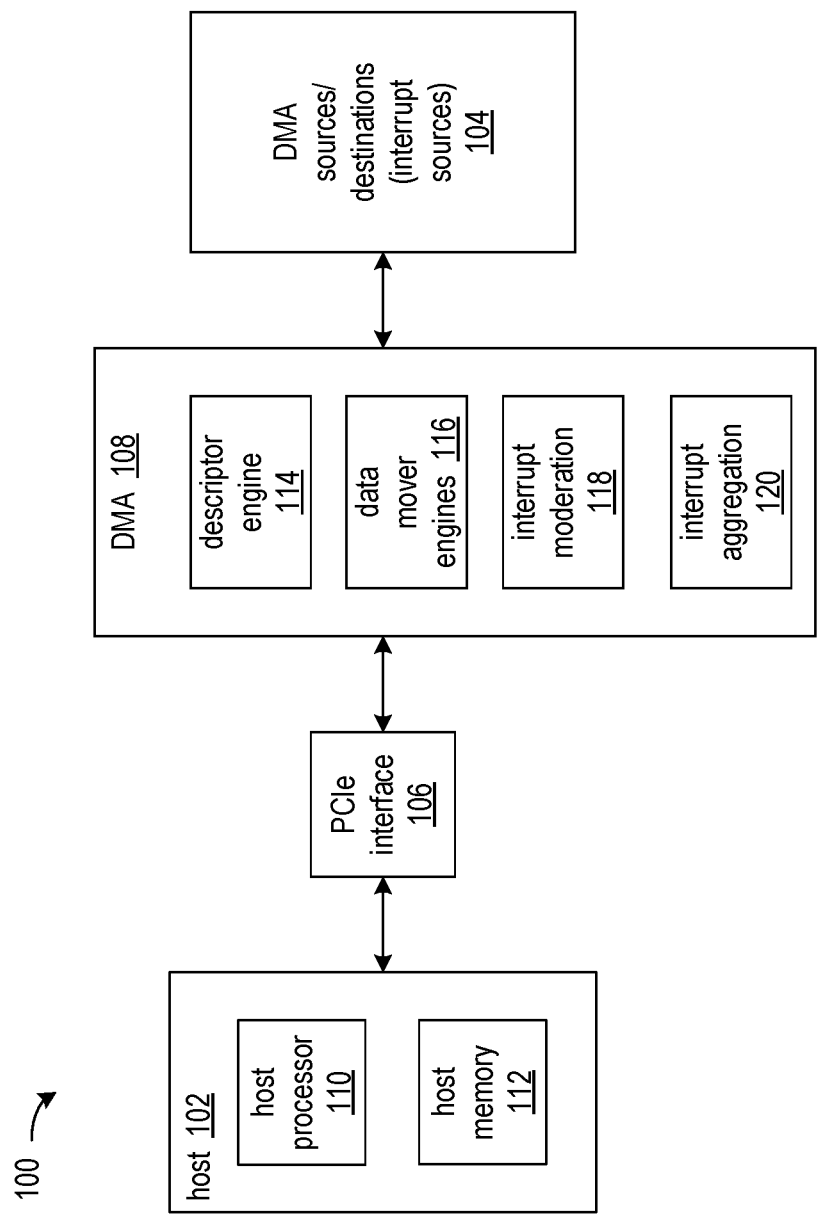
FIG. 1 shows a system in which a direct memory access (DMA) circuit has interrupt moderation circuitry and interrupt aggregation circuitry for controlling interrupt messages to a host data processing system.

In the following description, numerous specific details are set forth to describe specific examples presented herein. It should be apparent, however, to one skilled in the art, that one or more other examples and/or variations of these examples may be practiced without all the specific details given below. In other instances, well known features have not been described in detail so as not to obscure the description of the examples herein. For ease of illustration, the same reference numerals may be used in different diagrams to refer to the same elements or additional instances of the same element.

The disclosed systems and methods make multiple interrupt moderation modes available for issuing interrupts associated with different completion queues in a system. Different interrupt moderation modes can be established for the different completion queues. The different modes define different sets of trigger conditions for sending an interrupt message.

In an exemplary system, a memory circuit is configured to store multiple completion queues, and each completion queue has storage for completion descriptors associated with transfers of data from interrupt source circuits to the memory circuit. A direct memory access (DMA) circuit provides access to the memory circuit for the interrupt source circuits. An interrupt engine is a circuit responsible for issuing interrupt messages that signal to a host processor to process the completion descriptors in the completion queues. The interrupt engine is configured to issue an interrupt message in response to satisfaction of a set of trigger conditions specified in an active interrupt moderation mode. The interrupt engine bypasses issuing interrupt messages in response to the set of trigger conditions of the active interrupt moderation mode not being satisfied.

Aggregation rings can also be used to control processing of interrupt messages by the host processor. The interrupt engine receives completion requests from the interrupt sources, and each completion request identifies one of the completion queues. In response to a completion request, the interrupt engine determines an aggregation ring that is associated with the completion queue identified by the completion request. The host memory stores multiple interrupt aggregation rings, and each interrupt aggregation ring stores queue identifiers and associated queue information of selected ones of the completion queues. Once an aggregation queue has been identified, the interrupt engine stores the queue identifier and associated queue information in one of the interrupt aggregation rings.

The host processor processes entries in the completion queues in response to interrupt messages sent by the interrupt engine. Each interrupt message from the interrupt engine includes an identifier of an aggregation ring, and the host processor uses the aggregation ring identifier in an interrupt message to select one or more completion queues for processing.

FIG. 1 shows a system 100 in which a direct memory access (DMA) circuit has interrupt moderation circuitry and interrupt aggregation circuitry for controlling interrupt messages to a host data processing system 102. The host data processing system (or "host" for brevity) includes a host processor 110, which can include multiple processor cores and local host memory 112. The host can be coupled to peripheral components, such as network interface controllers, storage controllers, hardware accelerators in field programmable gate array (FPGA) circuitry etc., via a Peripheral Component Interface Express ("PCIe") interface 106 and a direct memory access (DMA) circuit 108.

The peripheral components are shown as block 104, which exemplifies DMA sources/destinations of data transfers. That is, a DMA source is a component that writes data to the host memory 112, and a DMA destination is a component that reads data from the host memory. Both DMA destinations and sources can be sources of interrupts to the host processor 110.

The DMA circuit 108 includes a descriptor engine 114, one or more data mover engines 116, an interrupt moderation engine 118, and an interrupt aggregation engine 120. The DMA circuit operates on descriptors received from the operating system executing on the host 102 and descriptors received from the DMA sources/destinations. The DMA circuit can move data from the host memory to a card (H2C direction, where card is a peripheral), or from a card to the host memory (C2H direction).

Each of the data mover engines 116 moves data from the host memory to a peripheral or from a peripheral to the host memory. For example, one data mover engine can move data from the host memory to the peripheral through an H2C Advanced eXtensible Interface Master (AXI-M) circuit, and another data mover can move data from a peripheral to the host memory through a separate C2H AXI-M circuit.

Completion descriptors from the DMA sources/destinations indicate to the host operating system when a data transfer is complete, and the DMA circuit 108 issues interrupt messages to the host to signal that a completion descriptor is ready for processing by the host. Completion queues, which are also referred to as "source queues," are circular queues maintained in host memory 112. The completion queues store completion descriptors from the DMA sources/destinations 104, which are "interrupt sources." Separate queues are maintained for each different interrupt source. The "producer" for the completion queues is the interrupt circuitry of the DMA circuit 108, and the "consumer" is the host. A producer index (PIDX) and a consumer index (CIDX) are maintained for each completion queue to avoid overwriting unread completion descriptors.

The interrupt moderation circuit 118 and interrupt aggregation circuit 120 cooperatively manage and moderate interrupt requests from the DMA sources/destinations 104 to the host processor 110. The interrupt moderation circuit provides different interrupt moderation modes that can be individually applied to different completion queues to control when interrupt messages are issued to the host, and the interrupt aggregation circuit provides a mechanism to group interrupts from different queues together for processing by the host. Each interrupt moderation mode defines a set of conditions that if satisfied result in the interrupt moderation circuit issuing an interrupt request to the interrupt aggregation circuit. The conditions can be based on a timer, a count of unprocessed completion descriptors on a completion queue, or a "user" trigger. A user trigger can be implemented as a code in a completion descriptor as set by an interrupt source. In response to satisfaction of the conditions in the active interrupt moderation mode of a completion queue, the interrupt moderation circuit issues an interrupt request to the interrupt aggregation circuit, which then issues an interrupt message to the host. If the conditions in the active interrupt moderation mode of a completion queue are not satisfied when a completion descriptor is received, the interrupt moderation circuit bypasses issuing an interrupt request to the interrupt aggregation circuit, which effectively causes the interrupt aggregation circuit to bypass issuing an interrupt message to the host.

In response to an interrupt request from the interrupt moderation circuit, the interrupt aggregation circuit determines the completion queue from the queue identifier specified in the interrupt request and determines the interrupt aggregation ring associated with the identified queue. The interrupt aggregation circuit then writes the queue identifier to the interrupt aggregation ring and issues the interrupt message to the host.

In response to receiving an interrupt message, the host determines the interrupt aggregation ring specified in the interrupt message and reads completion queue identifiers from the identified interrupt aggregation ring. The host then read entries from the identified completion queues and processes the completion descriptors.

Figure 2:
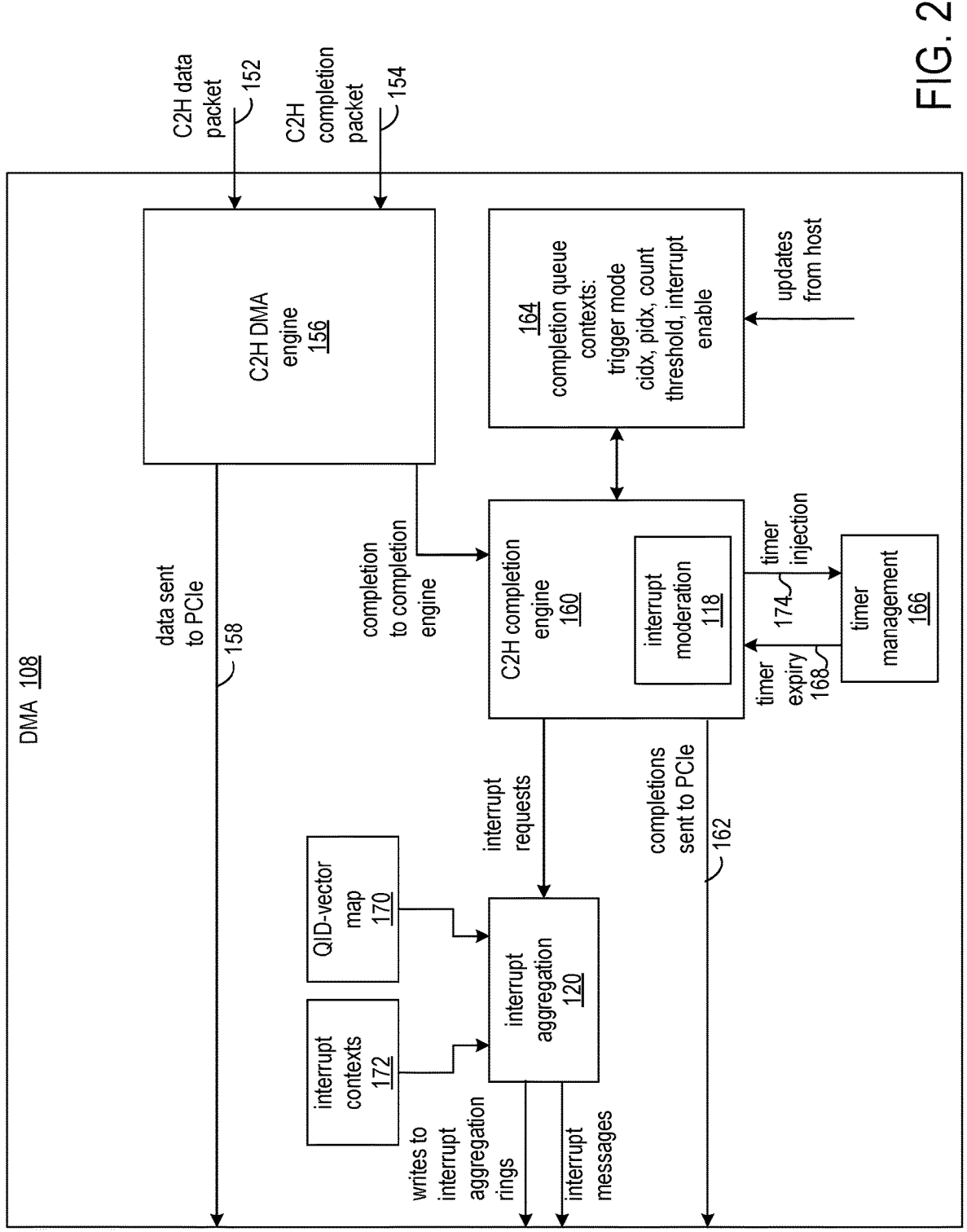
FIG. 2 shows interrupt moderation circuitry and interrupt aggregation circuitry in relation to card-to-host (C2H) circuitry in a DMA circuit.

FIG. 2 shows interrupt moderation circuitry and interrupt aggregation circuitry in relation to card-to-host (C2H) circuitry in a DMA circuit 108. Though the illustrated circuits process C2H communications, it will be appreciated that the DMA circuit would have comparable circuits that support H2C communications.

A DMA source/destination (FIG. 1, 104) provides a C2H data packet 152 having data to be written to host memory and the corresponding C2H completion packet 154 to the C2H DMA engine 156 in the DMA circuit. The completion packet contains a completion descriptor and a queue identifier ("QID") that indicates the completion queue to which the completion descriptor is to be written. The completion packet can also include a code that signals that issuing an interrupt request to the interrupt aggregation circuit is desired (see USER interrupt moderation modes described below). The C2H DMA engine writes the data from the C2H data packet to the host memory via a PCIe interface 158, and the completion packet is provided to the C2H completion engine 160.

The C2H completion engine 160 writes completion descriptors to the completion queues identified by the QIDs via the PCIe interface 162, and the interrupt moderation circuit 118 controls the issuing of interrupt requests, and thereby the issuing of interrupt messages by the interrupt aggregation circuit to the host for processing the completion queues. The host can select one of six modes for each completion queue. An indication of the selected mode, which can be referred to as the "active mode," for a queue is stored as part of the completion queue context for that queue in a local memory 164 within the DMA circuit 108. The completion queue context includes the active interrupt moderation mode, completion queue PIDX, the DMA copy of the completion queue CIDX, and a programmable threshold value for interrupt aggregation COUNT modes (described below). The completion queue context can also include an interrupt enable/disable flag that overrides the trigger mode. The active trigger mode of a queue can be changed by the host after the host sends the update of the completion queue CIDX to the DMA circuit. The ability to change the active interrupt moderation mode on the fly by the host software driver helps implementation of New Application Programming Interface (NAPI), which provides programming interfaces to access interrupt mitigation functions in the Linux kernel.

The issuing of interrupt requests for processing each completion queue can be controlled for each completion queue individually. The issuing of interrupt requests can be enabled or disabled for each completion queue. For example, the issuing of interrupt requests can be enabled for some completion queues and disabled for other completion queues. Also different interrupt moderation modes can be active for different ones of the completion queues.

The C2H completion engine 160 keeps only one interrupt request outstanding per completion queue. This policy is enforced even if all other conditions to send an interrupt are satisfied for the active interrupt moderation mode. The completion engine 160 determines that an interrupt message has been serviced from receipt of an updated to the CIDX for the associated completion queue.

The exemplary implementation provides six interrupt moderation modes. The modes include TRIGGER_EVERY, TRIGGER_USER, TRIGGER_USER_COUNT, TRIGGER_USER_TIMER, TRIGGER_USER_TIMER_COUNT, and TRIGGER_DIS. In the TRIGGER_EVERY mode, the interrupt moderation circuit 118 issues an interrupt request whenever the completion engine 160 determines that an unprocessed completion descriptor is present in the completion queue.

The TRIGGER_USER mode allows the interrupt source/destination to control the issuing of interrupt requests. In an exemplary implementation, the interrupt source/destination can write a value in the completion packet 154 to indicate that an interrupt request should be issued. In response to the value in the packet and the indicated completion queue being in the TRIGGER_USER interrupt moderation mode, the interrupt moderation circuit 118 issues an interrupt request once the completion engine 160 has sent the completion descriptor to the host.

The TRIGGER_USER_COUNT mode combines trigger conditions of the TRIGGER_USER mode with trigger conditions related to the number of accumulated completion descriptors in a completion queue. When the TRIGGER_USER_COUNT mode is active for a completion queue, the interrupt moderation circuit issues an interrupt request in response to the number of unread completion descriptors in the completion queue exceeding a threshold count value specified in the completion queue context. The threshold count value is programmable by the host on a per-queue basis. For a completion queue having the TRIGGER_USER_COUNT mode active, the interrupt moderation circuit also issues interrupt requests in response to the conditions described above in the TRIGGER_USER mode.

The TRIGGER_USER_TIMER mode combines trigger conditions of the TRIGGER_USER mode with trigger conditions related to expiration of a timer associated with the completion queue having the TRIGGER_USER_TIMER mode active. The timer management circuit 166 maintains respective timers for all completion queues that have the TRIGGER_USER_TIMER mode active. The timers can be implemented by one or more counter circuits, for example. The timer management circuit provides one or more timer expiry signals 168 to the interrupt moderation circuit 118 to indicate which timers have expired for the associated completion queues.

The timer injection signals 174 to the timer management circuit 166 indicate the QID and a time value. The time value indicates the period of time the timer management circuit should track for the queue indicated by the QID. The timer periods are programmable by the host through PCIe, for example. Several circular FIFO buffers can be used to store the active timers. A reference timer can be compared to the timers in the FIFO buffers to determine which timers have expired.

For a completion queue having the TRIGGER_USER_TIMER mode active, the interrupt moderation circuit also issues interrupt requests in response to the conditions described above in the TRIGGER_USER mode.

The TRIGGER_USER_TIMER_COUNT mode combines trigger conditions of the TRIGGER_USER_TIMER and TRIGGER_USER_COUNT modes described above. For a completion queue having the TRIGGER_USER_TIMER_COUNT mode active, the interrupt moderation circuit also issues interrupt requests in response to the conditions described above in the TRIGGER_USER_TIMER and TRIGGER_USER_COUNT modes.

The TRIGGER_DIS mode disables the issuing of interrupt requests for a completion queue. In this mode, the completion engine 160 does not send C2H completion interrupts in spite of them being enabled for a given queue. The host driver can read the completion queue by regularly polling the queue. The host driver will use color bit feature provided in the completion queue when this mode is set. In this mode, the completion engine continues to write completion descriptors to the completion queue. However, interrupt messages and status descriptors are not generated. The status descriptor is at the last entry of the completion queue and holds the status of the completion queue, such as PIDX, CIDX etc. Therefore, the software driver can still poll the completion queue in this mode.

Along with each interrupt request issued by the interrupt moderation circuit 118, the PIDX and CIDX of the completion queue and the QID are transmitted to the interrupt aggregation circuit 120. The interrupt aggregation circuit accesses a QID-vector map 170 to determine the aggregation ring to which the completion queue is assigned. Each aggregation ring can be identified by an index value. The aggregation circuit then looks up the context of the ring in the interrupt context table 172. The context provides a base address in host memory 112 (FIG. 1) of the identified aggregation ring and an aggregation ring PIDX. The aggregation circuit writes the QID, an interrupt type, a status descriptor that includes the completion ring PIDX and CIDX etc. to the interrupt aggregation ring identified by the interrupt context at the index specified by the aggregation ring PIDX. The interrupt aggregation circuit also completes generation of the interrupt message to the host by including in the interrupt message, the interrupt vector index read from the interrupt context map 172.

Figure 3:
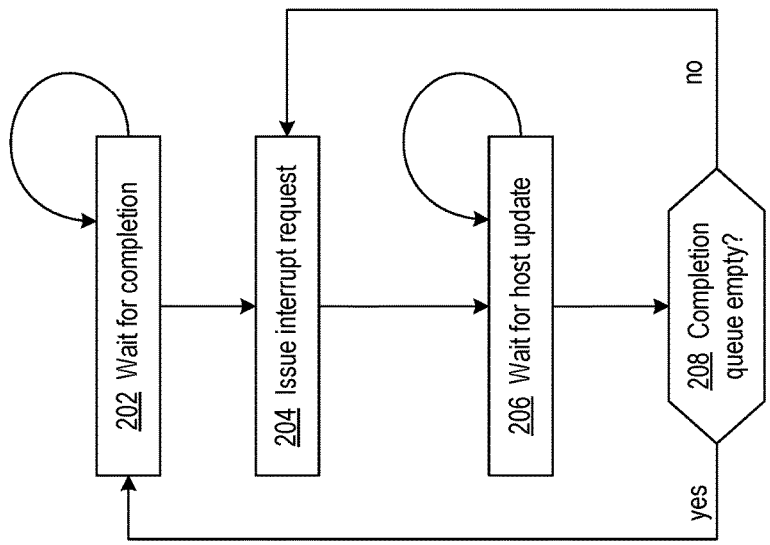
FIG. 3 shows a flowchart of a process performed by the interrupt moderation circuit for the TRIGGER-EVERY interrupt moderation mode.

FIG. 3 shows a flowchart of a process performed by the interrupt moderation circuit 118 (FIG. 2) for the TRIGGER-EVERY interrupt moderation mode. In response to the TRIGGER-EVERY mode being active for a completion queue, the interrupt moderation circuit issues an interrupt request in response to the input of each completion descriptor and storage of the completion descriptor in the completion queue in host memory. At block 202, the interrupt moderation circuit waits for a completion packet from an interrupt source. In response to receiving a completion descriptor and storing the completion descriptor in the completion queue, at block 204, the interrupt moderation circuit issues an interrupt request to the interrupt aggregation circuit 120 (FIG. 2), and at block 206, the interrupt moderation circuit waits for the host to communicate the update of the completion queue CIDX.

At decision block 208, the interrupt moderation circuit determines whether or not the completion queue is empty based on the values of the completion queue CIDX and PIDX. If there are unprocessed completion descriptors in the completion queue, the interrupt moderation circuit issues another interrupt request at block 204. Otherwise, the interrupt moderation circuit returns to block 202 to wait for a completion request.

Figure 4:
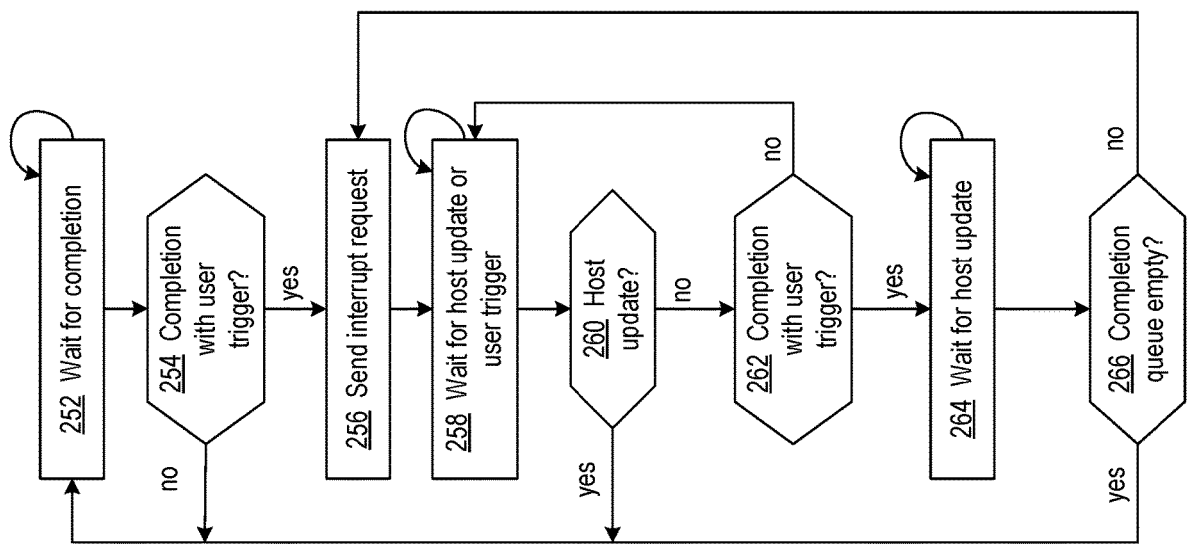
FIG. 4 shows a flowchart of a process performed by the interrupt moderation circuit for the TRIGGER-USER interrupt moderation mode.

FIG. 4 shows a flowchart of a process performed by the interrupt moderation circuit 118 (FIG. 2) for the TRIGGER-USER interrupt moderation mode. The TRIGGER-USER mode supports per-completion-queue interrupts to be initiated by user logic. In response to the TRIGGER-USER mode being active for a completion queue, the interrupt moderation circuit issues an interrupt request in response to receiving a completion descriptor having a code that indicates an interrupt request is to be issued, and storage of the completion descriptor in the completion queue in host memory. At block 252, the interrupt moderation circuit waits to receive a completion descriptor from an interrupt source. In response to receiving the completion descriptor, the interrupt moderation circuit determines at decision block 254 whether the completion descriptor specifies a user trigger. If not, the interrupt moderation circuit bypasses issuing an interrupt request and returns to block 252 to wait to receive another completion descriptor.

In response to the completion descriptor indicating a user trigger and storing the completion descriptor in the completion queue, at block 256 the interrupt moderation circuit issues an interrupt request to the interrupt aggregation circuit 120 (FIG. 2), and at block 258, the interrupt moderation circuit waits for the host to communicate the update of the completion queue CIDX or receipt of another completion descriptor having a user trigger. In response to receiving the update of the completion queue CIDX, at block 260 the interrupt moderation circuit returns to block 252 to wait for the next completion descriptor. In response to receiving another completion descriptor having a user trigger at block 262, the interrupt moderation circuit continues at block 264 to wait for the host to communicate the update of the completion queue CIDX. In response to receiving the completion queue CIDX and the completion queue not being empty, at block 266 the interrupt moderation circuit issues another interrupt request. If the completion queue is empty, the interrupt moderation circuit returns to block 252 to wait for another completion descriptor.

Figure 5:
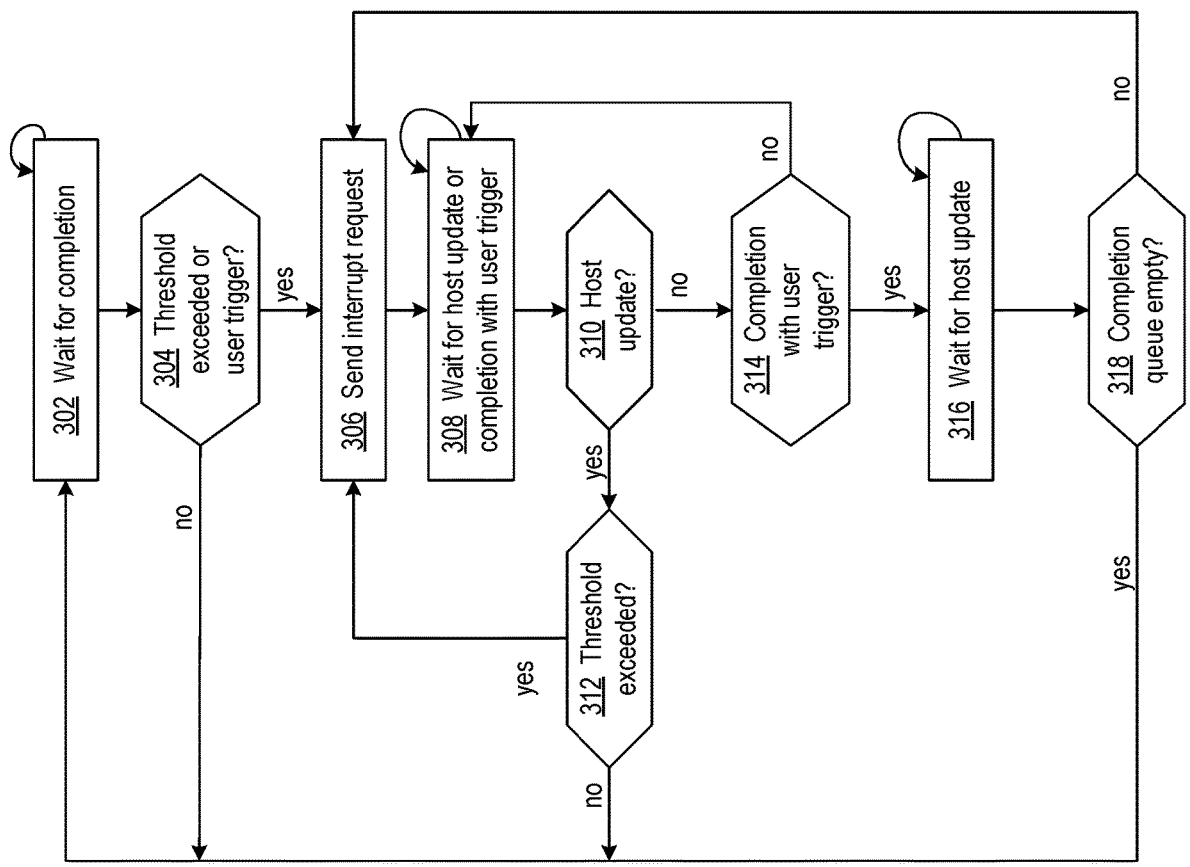
FIG. 5 shows a flowchart of a process performed by the interrupt moderation circuit for the TRIGGER-USER-COUNT interrupt moderation mode.

FIG. 5 shows a flowchart of a process performed by the interrupt moderation circuit 118 (FIG. 2) for the TRIGGER-USER-COUNT interrupt moderation mode. In response to the TRIGGER-USER-COUNT mode being active for a completion queue, the interrupt moderation circuit issues an interrupt request in response to either a completion descriptor having a user trigger or a number of unread completion descriptors in the completion queue exceeding a threshold. Though counter and timer based interrupts may be common, the counter and timer can be overridden by the user-triggered interrupt.

At block 302, the interrupt moderation circuit waits to receive a completion descriptor. Once a completion descriptor is received, at decision block 304, the interrupt moderation circuit determines if the threshold count has been exceeded or the completion descriptor indicates a user trigger. Based on the completion queue PIDX and CIDX, the interrupt moderation circuit can determine the number of unprocessed completion descriptors in the completion queue. The interrupt moderation circuit compares the number of unprocessed completion descriptors to the threshold count programmed for that completion queue to determine whether or not the threshold has been exceeded. If either the completion descriptor specifies a user trigger or the threshold count has been exceeded, at block 306 the interrupt moderation circuit issues an interrupt request. The interrupt moderation circuit returns to block 302 if the threshold count was not exceeded and there was no user trigger.

At block 308, the interrupt moderation circuit waits for the host to communicate the update of the completion queue CIDX or receipt of another completion descriptor having a user trigger. In response to the update of the completion queue CIDX at decision block 310, the interrupt moderation circuit, at block 312, again checks to see whether or not the threshold count is exceeded by the number of completion descriptors in the completion queue. If the threshold count has been exceeded, the interrupt moderation circuit returns to block 306 to issue an interrupt request. If the threshold is not exceeded, the interrupt moderation circuit returns to block 302 to wait for another completion descriptor.

In response to receiving another completion descriptor at block 308 and the completion descriptor indicating a user trigger, decision block 314 directs the interrupt moderation circuit to block 316 to wait for the host update of the completion queue CIDX. In response to the update of the completion queue CIDX and the completion queue 318 having unprocessed completion descriptors, the interrupt moderation circuit returns to block 306 to issue an interrupt request. Otherwise, the interrupt moderation circuit returns to block 302 to wait for a completion descriptor.

Figure 6:
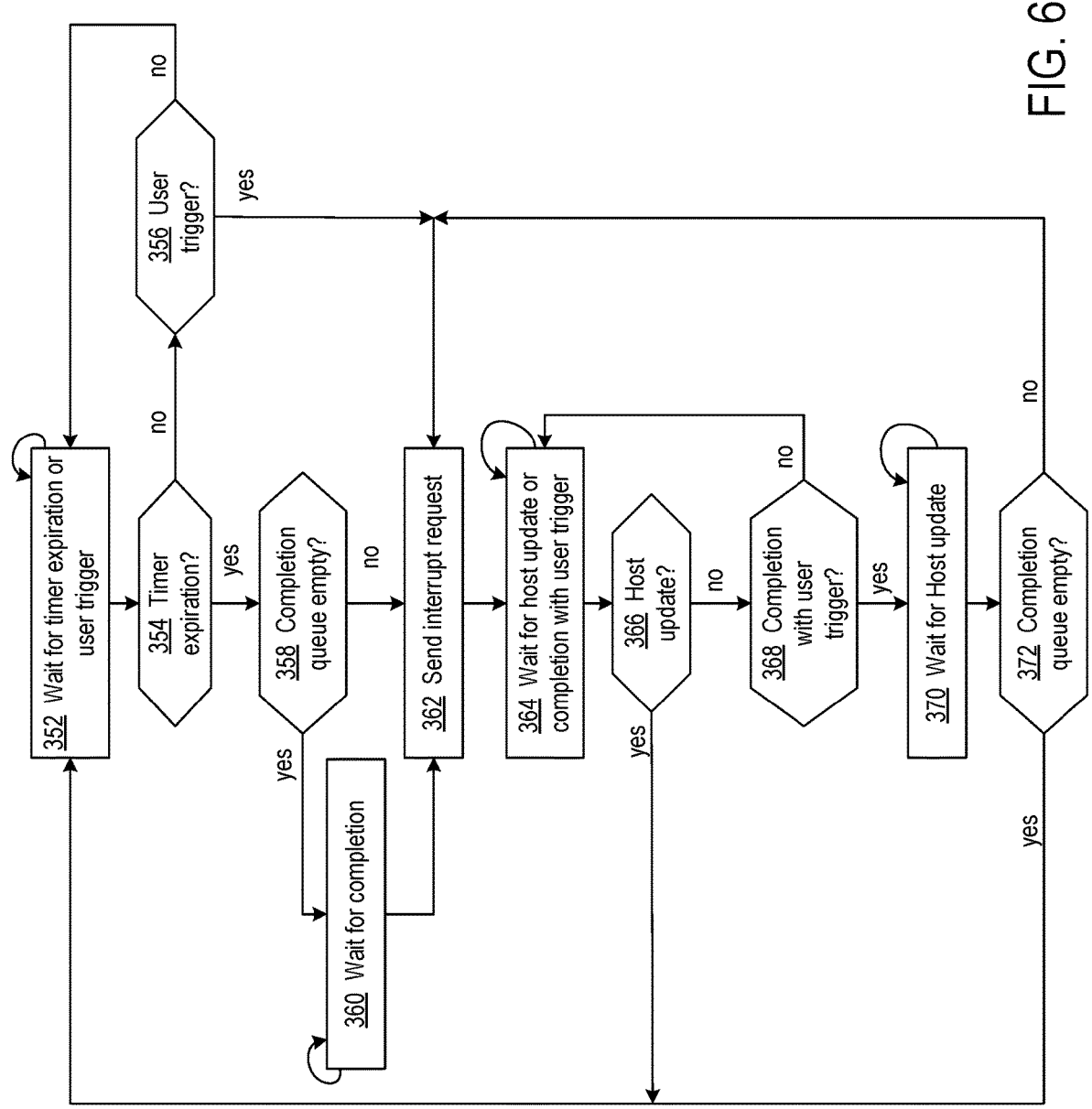
FIG. 6 shows a flowchart of a process performed by the interrupt moderation circuit for the TRIGGER-USER-TIMER interrupt moderation mode.

FIG. 6 shows a flowchart of a process performed by the interrupt moderation circuit 118 (FIG. 2) for the TRIGGER-USER-TIMER interrupt moderation mode. In response to the TRIGGER-USER-TIMER mode being active for a completion queue, the interrupt moderation circuit issues an interrupt request in response to either a completion descriptor having a user trigger or the expiration of a timer. At block 352, the interrupt moderation circuit waits for a timer expiration signal or receipt of a completion descriptor. In response to receiving a timer expiration signal as determined at decision block 354, the interrupt moderation circuit at decision block 358 determines whether or not the completion queue is empty. If empty, the interrupt moderation circuit waits for a completion descriptor at block 360 and proceeds to block 362 once a completion descriptor is received. Otherwise, the interrupt moderation circuit issues an interrupt request at block 362.

If the interrupt moderation circuit receives a completion descriptor at block 352 and no timer expiration signal has been received, decision block 354 directs the interrupt moderation circuit to decision block 356. In response to the completion descriptor indicating a user trigger, the interrupt moderation circuit issues an interrupt request at block 362. Otherwise, the interrupt moderation circuit returns to block 352.

After issuing an interrupt request, at block 364 the interrupt moderation circuit waits for the host 366 to communicate the update of the completion queue CIDX or receipt of a completion descriptor having a user trigger. In response to receiving the updated completion queue CIDX, the interrupt moderation circuit returns to block 352. If the updated completion queue CIDX has not yet been received, and in response to receiving a completion descriptor, at decision block 368 the interrupt moderation circuit determines whether or not the completion descriptor specified a user trigger. If not, the interrupt moderation circuit returns to block 364. If the received completion descriptor specifies a user trigger, the interrupt moderation circuit waits for the updated completion queue CIDX at block 370. After receiving the updated completion queue CIDX, at decision block 372 the interrupt moderation circuit determines whether or not the completion queue is empty. If there are unprocessed completion descriptors in the completion queue, the interrupt moderation circuit returns to block 362 and issues an interrupt request. Otherwise, if the completion queue is empty the interrupt moderation circuit returns to block 352 to wait for a timer expiration or a completion descriptor having a user trigger.

Figure 7:
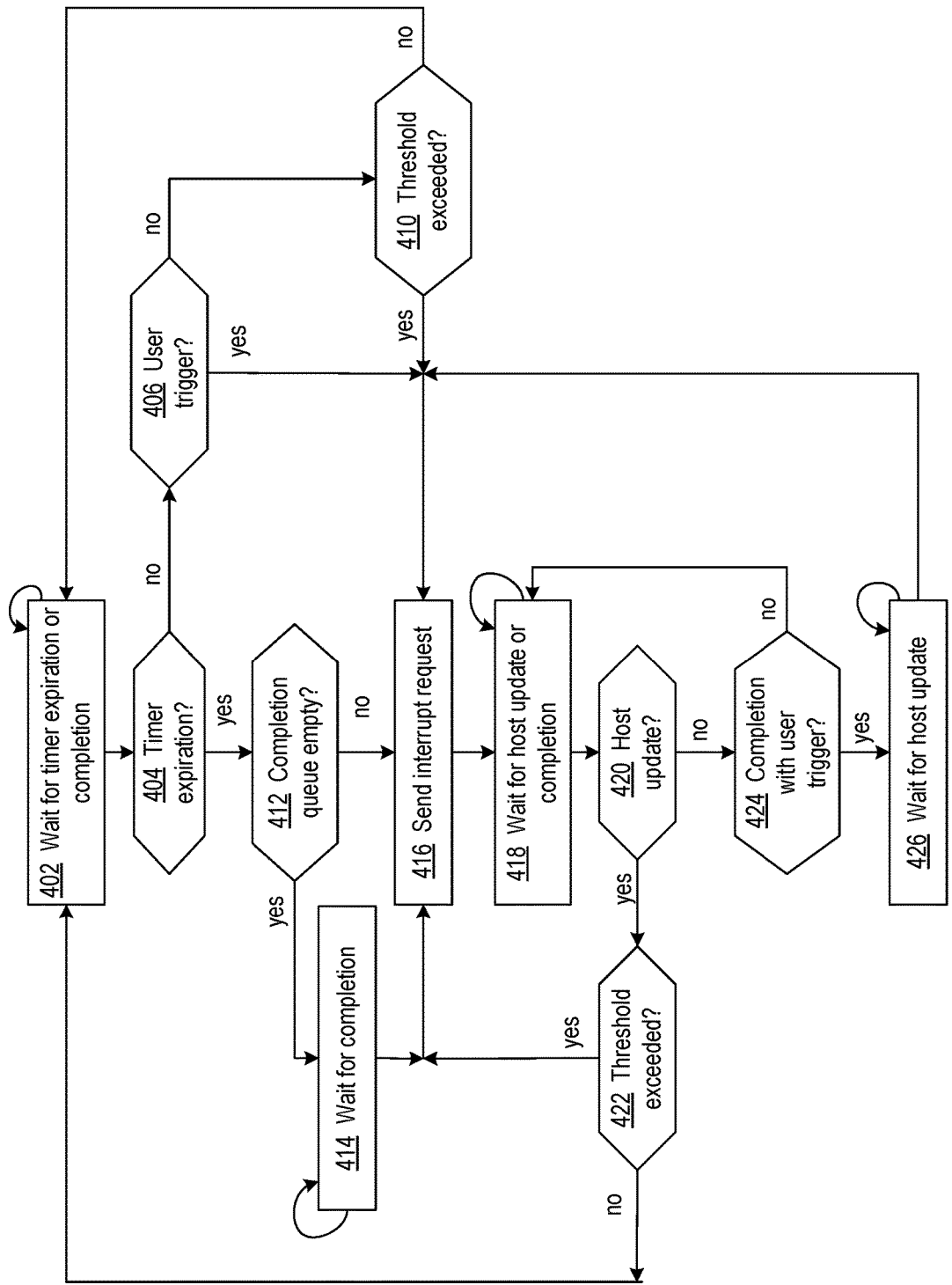
FIG. 7 shows a flowchart of a process performed by the interrupt moderation circuit for the TRIGGER-USER-TIMER-COUNT interrupt moderation mode.

FIG. 7 shows a flowchart of a process performed by the interrupt moderation circuit for the TRIGGER-USER-TIMER-COUNT interrupt moderation mode. In response to the TRIGGER-USER-TIMER-COUNT mode being active for a completion queue, the interrupt moderation circuit issues an interrupt request in response to a completion descriptor having a user trigger, the expiration of a timer, or the number of unprocessed completion descriptors in the completion queue exceeding a threshold count.

At block 402, the interrupt moderation circuit waits for a timer expiration signal or receipt of a completion descriptor. In response to receiving a timer expiration signal, the interrupt moderation circuit proceeds from decision block 404 to decision block 412 to check the completion queue for unprocessed completion descriptors. If the completion queue is empty, the interrupt moderation circuit waits for a completion descriptor at block 414. Otherwise, the interrupt moderation circuit issues an interrupt request at block 416.

In response to receiving a completion descriptor at block 402 and no timer expiration, the interrupt moderation circuit proceeds from decision block 404 to decision block 406 to check for a user trigger in the completion descriptor. If a user trigger is present in the completion descriptor, the interrupt moderation circuit proceeds to block 416 and issues an interrupt request. If no user trigger is present, the interrupt moderation circuit at decision block 410 checks to see if the number of unprocessed completion descriptors exceeds the threshold count. The interrupt moderation circuit proceeds to block 416 and issues an interrupt request if the threshold count is exceeded. Otherwise, the interrupt moderation circuit returns to block 402 to wait for a completion descriptor.

After issuing an interrupt request at block 416, the interrupt moderation circuit waits at block 418 to receive the host update 420 of the completion queue CIDX or another completion descriptor. In response to receiving the host update of the completion queue CIDX, the interrupt moderation circuit determines at decision block 422 whether or not the threshold count is exceeded. In response to the number of unprocessed completion descriptors in the completion queue exceeding the threshold count, the interrupt moderation circuit proceeds to block 416 and issues an interrupt request.

In response to receiving a completion descriptor at block 418, the interrupt moderation circuit at decision block 424 determines whether or not the completion descriptor indicates a user trigger. If so, at block 426 the interrupt moderation circuit waits for an update of the completion queue CIDX from the host and then proceeds to issue an interrupt request at block 416. If the completion descriptor does not indicate a user trigger, the interrupt moderation circuit returns to block 418 to wait for the host update of the CIDX or another completion descriptor.

Figure 8:
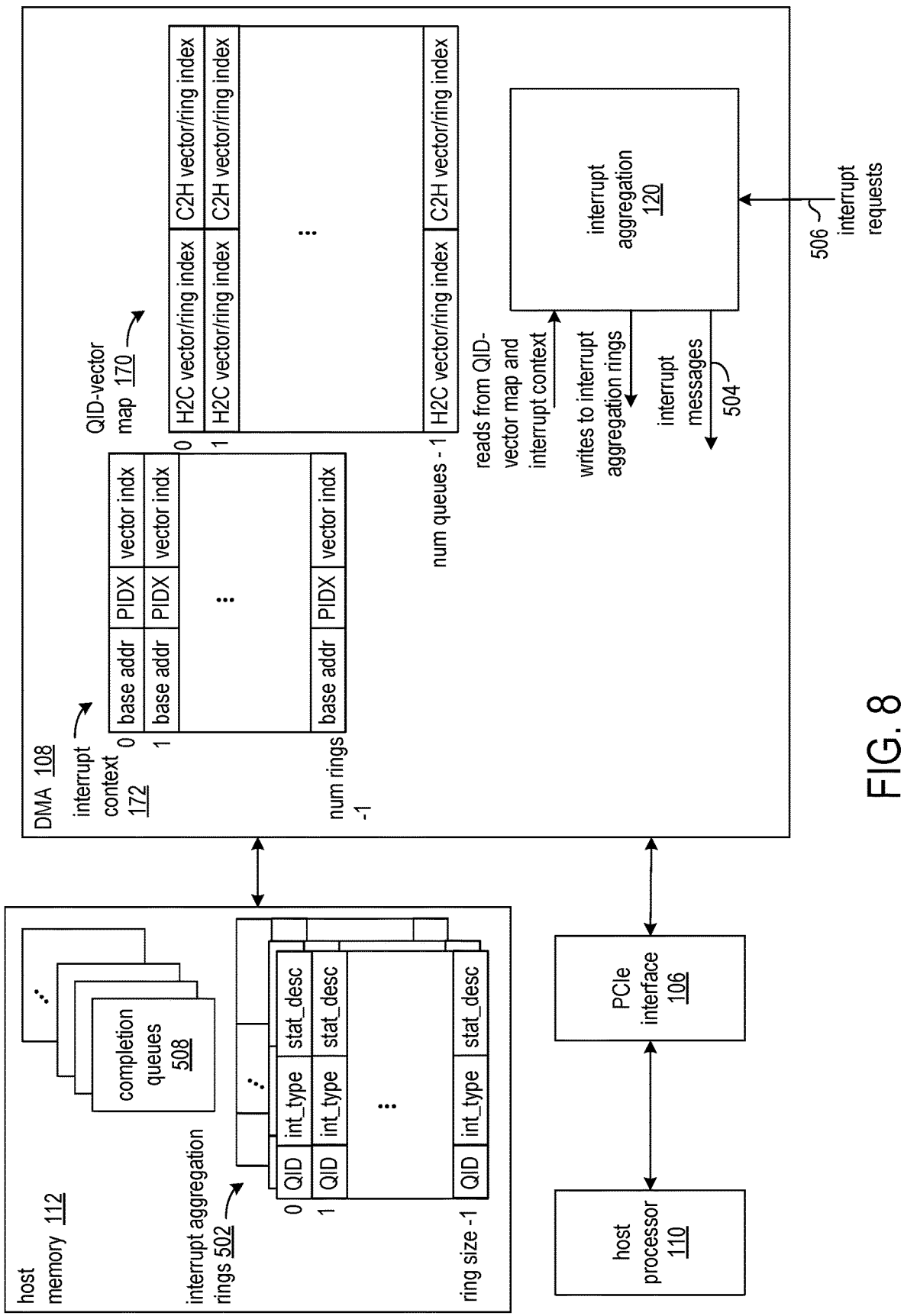
FIG. 8 shows further aspects of the system, including the interrupt aggregation engine and supporting data structures.

FIG. 8 shows further aspects of the system 100, including the interrupt aggregation engine 120 and supporting data structures. The interrupt aggregation circuit accesses the QID-vector map and interrupt context map 172 in maintaining the interrupt aggregation rings 502 and issuing interrupt message 504. The QID-vector map and interrupt context map can be stored in one or more memories local to the DMA circuit 108.

The interrupt aggregation circuit 120 receives interrupt requests 506 from the interrupt moderation circuit 118 (FIG. 1). In response to receiving an interrupt request, the interrupt aggregation circuit uses the queue identifier in the interrupt request as an index into the QID-vector map 170 to read an entry. The QID-vector map in an exemplary implementation has 2048 entries to support 2048 completion queues. Each entry includes a first portion for H2C interrupts and a second portion for C2H interrupts. QID-vector map 170 maps QIDs to vectors and indicates if the interrupt request is a direct interrupt mode or an indirect interrupt mode. If the input interrupt request is a direct interrupt mode, the interrupt request is supplemented with the vector specified in the QID-vector map. If the input interrupt request is indirect interrupt mode, the interrupt aggregation circuit uses the ring index associated with the queue identifier as an index in the interrupt context map 172.

For an indirect interrupt request, the interrupt aggregation circuit 120 uses the ring index read from the QID-vector map to read an entry from the interrupt context map 172.

Each entry in the interrupt context map includes the base address in host memory 112 of one of the aggregation rings 502, the current value of the producer index (PIDX) used by the interrupt aggregation circuit to write an entry to the aggregation ring, and a vector index into a table that references interrupt drivers. The interrupt aggregation circuit communicates the vector index to the host along with the interrupt message.

The interrupt aggregation circuit 120 writes an entry to an interrupt aggregation ring 502 at the PIDX found in the interrupt context map 172. Each entry in an interrupt aggregation ring can include the queue identifier that identifies one of the completion queues 508, a color bit whose value is flipped each time the PIDX wraps around the associated ring, bits that indicate whether the interrupt type is an H2C or a C2H, and a status descriptor. The status descriptor can include a color bit for the associated one of the completion queues, a consumer index (CIDX) into the completion queue, and a producer index (PIDX) into the completion queue. The PIDX in the status descriptor is a copy of the PIDX used by the completion engine 160 (FIG. 2) in writing to the completion queue. The CIDX is used by the host software in reading from the completion queue. The value of the color bit and values of the PIDX and CIDX indicate to the interrupt moderation circuit 118 (FIG. 2) and host software which entries are valid. Writing the status descriptor to the aggregation ring makes the status descriptor available to the software driver when the driver reads the aggregation ring, which eliminates the driver having to read the status descriptors from the completion queues associated in the aggregation ring. After writing an entry in an interrupt aggregation ring, the interrupt aggregation circuit issues the completed interrupt message to the host processor 110 over PCIe interface 106. Passing the PIDX and CIDX in the interrupt aggregation ring in conjunction with the interrupt message can help to reduce the number of reads, because when the software driver executing on the host processor reads from the interrupt aggregation ring, it already obtains the status descriptor of the associated completion ring. It doesn't need to read the completion queue to obtain the same information.

Events for error and asynchronous interrupts are pushed into the aggregation ring, thereby avoiding the need for periodically reading the status register. When the driver reads the error bit from the interrupt aggregation ring entry, the software driver is alerted to the error condition and can bypass regular polling of the status register.

In response to receiving an interrupt message, the host processor executes the driver software referenced by the interrupt vector in the interrupt message. Each interrupt vector has an associated interrupt aggregation ring. The software driver reads the associated interrupt aggregation ring 502 based on the interrupt vector indicated by the interrupt message and determine which completion queue(s) need service based on the entries read from the interrupt aggregation ring. After the software driver reads entries from the interrupt aggregation ring, the software driver dynamically updates the CIDX of the interrupt aggregation ring to indicate the cumulative pointer that the software reads from. If the software CIDX is equal to the PIDX, this will trigger a write to the interrupt context 172 on the interrupt state of that queue. The write indicates that the software driver has read all of the entries in the interrupt aggregation ring. If the software driver CIDX is not equal to the PIDX, the DMA circuit will send another interrupt message, signaling the driver software to read from the interrupt aggregation ring again.

Figure 9:
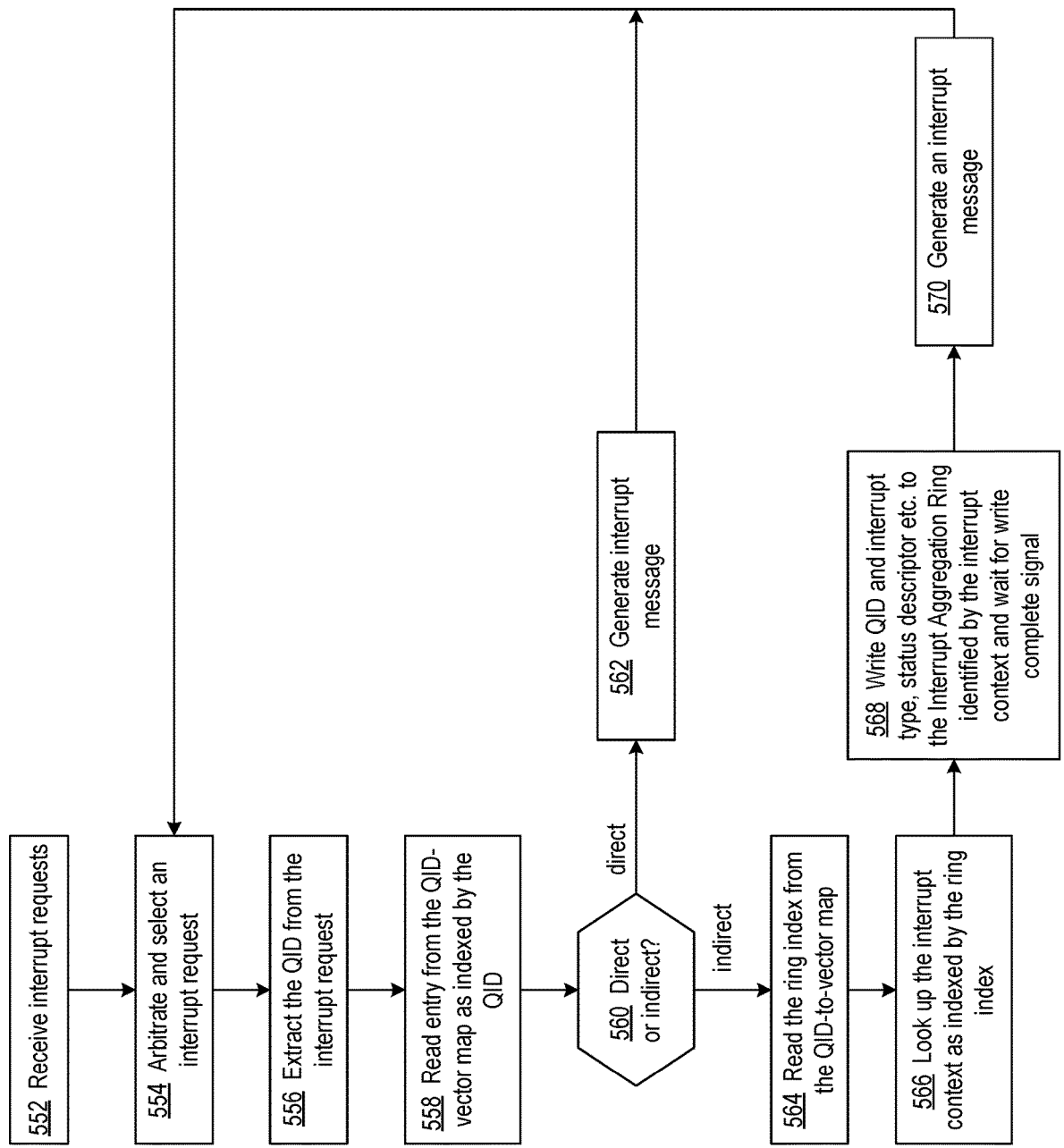
FIG. 9 shows a flowchart of a process performed by the interrupt aggregation circuit.

FIG. 9 shows a flowchart of a process performed by the interrupt aggregation circuit 120 (FIGS. 1, 8). At block 552, the interrupt aggregation circuit receives interrupt requests from the interrupt moderation circuit(s). As the DMA circuit 108 (FIG. 2) can have multiple completion engines for different transfers (e.g., C2H and H2C), interrupt requests can be received from different interrupt moderation circuits 118 (FIG. 2). At block 554, the interrupt aggregation circuit arbitrates and selects an interrupt request for processing. Round-robin or another priority scheme suitable for the application can be used. At block 556, the interrupt aggregation circuit extracts the completion queue identifier (QID) from the interrupt request, and at block 558 reads an entry from the QID-vector map 170 (FIG. 8) as indexed by the QID.

Based on the entry read from the QID-vector map, the interrupt aggregation circuit at block 560 determines whether the interrupt requests are direct or indirect interrupt requests. For a direct interrupt request, the interrupt aggregation circuit at block 562 bypasses processing associated with the interrupt aggregation rings, and generates and issues the interrupt message to the host and returns to block 554. The interrupt request includes the interrupt vector, which the interrupt aggregation circuit passes along to the host.

For an indirect interrupt request, the interrupt aggregation circuit at block 564 reads the ring index from the QID-vector map 170 (FIG. 8), and at block 566 looks-up the interrupt context in the interrupt context map 172 (FIG. 8) as indexed by the ring index. At block 568, the interrupt aggregation circuit writes an entry to the aggregation ring referenced by the base address and PIDX read from the interrupt context map. The entry includes the QID of the completion queue, the type of interrupt, and the status descriptor. Writing the status descriptor to the aggregation ring makes the status descriptor available to the software driver when the driver reads the aggregation ring, which eliminates the driver having to read the status descriptors from the completion queues associated in the aggregation ring. At block 570, after the interrupt aggregation circuit receives the write complete signal from the host indicating that the write to the interrupt aggregation ring is complete, the interrupt aggregation circuit issues the interrupt message to the host and returns to block 554.

Figure 10:
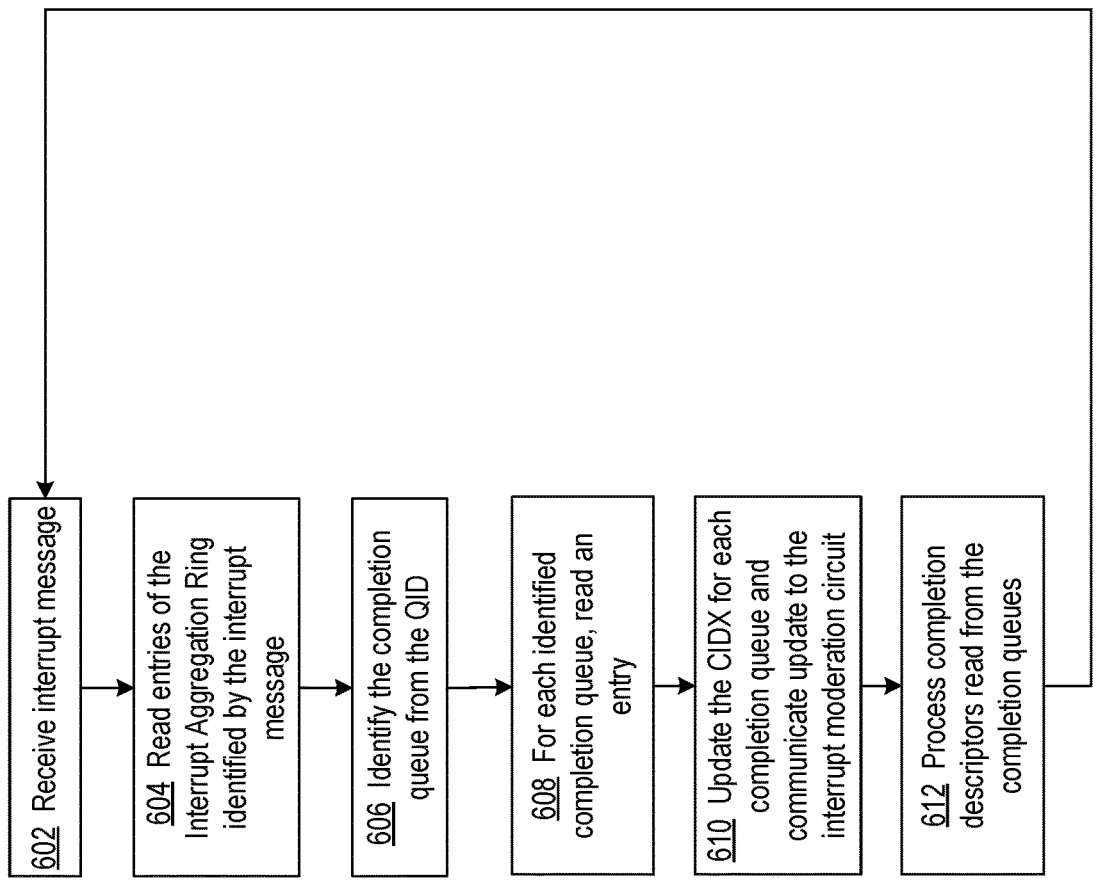
FIG. 10 shows a process performed by a software driver executing on the host processor in processing indirect interrupt messages.

FIG. 10 shows a process performed by a software driver executing on the host processor 110 (FIG. 1) in processing indirect interrupt requests. At block 602, the software driver receives an interrupt message from the interrupt aggregation circuit. The interrupt message identifies an interrupt aggregation ring, and the software driver reads the entries from the ring at block 604. The software driver reads up to the last-written entry in the interrupt aggregation ring. The software driver identifies the last-written entry by the color bit or by the status descriptor of the completion queue. Having the status descriptors available in the aggregation ring to the software driver when the driver reads the aggregation ring, the software driver can immediately start processing descriptors in the completion queues and not have to perform extra reads for the status descriptors stored at the end of the completion queues.

For each entry read from the interrupt aggregation ring, at block 606 the software driver determines the completion queue from the QID in the entry. At block 608, the software driver reads a completion descriptor from each completion queue identified at block 606 and updates the CIDX value accordingly. After the software driver reads the completion queue, at block 610 the software driver updates the CIDX of the completion queue and communicates the updated CIDX to the C2H completion engine, which stores the CIDX locally. When interrupt moderation circuit sends the interrupt request to the interrupt aggregation logic, the interrupt moderation circuit also sends the status descriptor, which has the CIDX and PIDX of the completion queue. When the interrupt aggregation circuit writes to the interrupt aggregation ring, the interrupt aggregation circuit writes the status descriptor into the completion ring.

The software driver communicates the updated CIDX values to the interrupt moderation circuit 118 (FIG. 2), which allows the interrupt moderation circuit to write new completion descriptors to the completion queues without overflowing the queues and to determine whether any threshold count has been exceeded. At block 612, the software driver processes the completion descriptor(s) according to the DMA transaction requirements.

Figure 11:
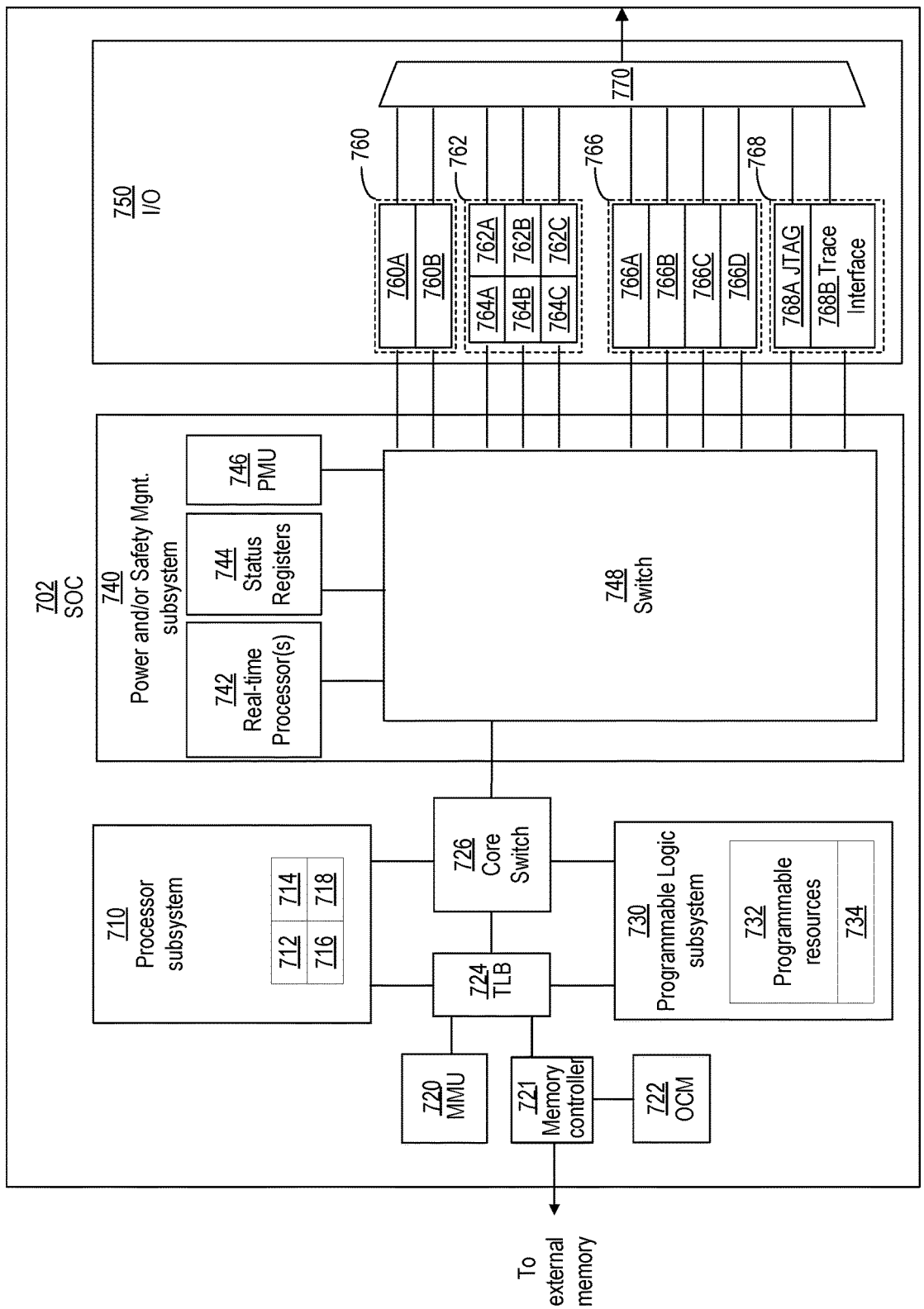
FIG. 11 shows an exemplary programmable IC that can be configured in accordance with the disclosed circuitry.

FIG. 11 shows an exemplary programmable IC 702 that can be configured in accordance with the disclosed circuitry. The programmable IC may also be referred to as a System On Chip (SOC), which includes a processor subsystem 710 and a programmable logic subsystem 730. The processor subsystem 710 may be programmed to implement a software portion of the user design, via execution of a user program. The program may be specified as part of a configuration data stream or may be retrieved from an on-chip or off-chip data storage device. The processor subsystem 710 may include various circuits 712, 714, 716, and 718 for executing one or more software programs. The circuits 712, 714, 716, and 718 may include, for example, one or more processor cores, floating point units (FPUs), an interrupt processing unit, on chip-memory, memory caches, and/or cache coherent interconnect.

The programmable logic subsystem 730 of the programmable IC 702 may be programmed to implement a hardware portion of a user design. For instance, the programmable logic subsystem may include a number of programmable resources 732, which may be programmed to implement a set of circuits specified in a configuration data stream. The programmable resources 732 include, for example, programmable interconnect circuits, programmable logic circuits, and configuration memory cells. The programmable logic implements the logic of a user design using programmable elements that can include, for example, function generators, registers, arithmetic logic, and so forth. Programmable interconnect circuits may include a large number of interconnect lines of varying lengths interconnected by programmable interconnect points (PIPs).

The programmable resources 732 may be programmed by loading a configuration data stream into the configuration memory cells, which define how the programmable interconnect circuits and programmable logic circuits are configured. For example, setting a configuration memory cell for a configurable latch to a first value may direct the configurable latch to operate as a single-edge-driven latch. Setting the configuration memory cell to a second value may direct the configurable latch to operate as a double-edge-driven latch. The collective states of the individual memory cells then determine the function of the programmable resources 732. The configuration data can be read from memory (e.g., from an external PROM) or written into the programmable IC 702 by an external device. In some implementations, a configuration controller 734 included in the programmable logic subsystem 730 may program the programmable resources, in response to powering on the programmable IC, by retrieving configuration data from a non-volatile memory coupled to the programmable IC and loading the configuration data into the configuration memory cells. In some other implementations, the configuration data may be loaded into the configuration memory cells by a start-up process executed by the processor subsystem 710.

The programmable IC 702 may include various circuits to interconnect the processor subsystem 710 with circuitry implemented within the programmable logic subsystem 730. In this example, the programmable IC 702 includes a core switch 726 that can route data signals between various data ports of the processor subsystem 710 and the programmable logic subsystem 730. The core switch 726 may also route data signals between either of the programmable logic or processing subsystems 710 and 730 and various other circuits of the programmable IC, such as an internal data bus. Alternatively or additionally, the processor subsystem 710 may include an interface to directly connect with the programmable logic subsystem—bypassing the core switch 726. Such an interface may be implemented, for example, using the AMBA AXI Protocol Specification (AXI) as published by ARM.

In some implementations, the processor subsystem 710 and the programmable logic subsystem 730 may also read or write to memory locations of an on-chip memory 722 or off-chip memory (not shown) via memory controller 721. The memory controller 721 can be implemented to communicate with one or more different types of memory circuits including, but not limited to, Double Data Rate (DDR) 2, DDR3, and DDR4 types of memory, whether 16-bit, 32-bit, 16-bit with ECC, etc. The list of different memory types with which memory controller 721 is able to communicate is provided for purposes of illustration only and is not intended as a limitation or to be exhaustive. As shown in FIG. 7, the programmable IC 702 may include a memory management unit 720 and translation look-aside buffer 724 to translate virtual memory addresses used by the subsystems 710 and 730 to physical memory addresses used by the memory controller 721 to access specific memory locations.

The programmable IC may include an input/output (I/O) subsystem 750 for communication of data with external circuits. The I/O subsystem 750 may include various types of I/O devices or interfaces including for example, flash memory type I/O devices, higher performance I/O devices, lower performance interfaces, debugging I/O devices, and/or RAM I/O devices.

The I/O subsystem 750 may include one or more flash memory interfaces 760 illustrated as 760A and 760B. For example, one or more of flash memory interfaces 760 can be implemented as a Quad-Serial Peripheral Interface (QSPI) configured for 4-bit communication. One or more of flash memory interfaces 760 can be implemented as a parallel 8-bit NOR/SRAM type of interface. One or more of flash memory interfaces 760 can be implemented as a NAND interface configured for 8-bit and/or 16-bit communication. It should be appreciated that the particular interfaces described are provided for purposes of illustration and not limitation. Other interfaces having different bit widths can be used.

The I/O subsystem 750 can include one or more interfaces 762 providing a higher level of performance than flash memory interfaces 760. Each of interfaces 762A-762C can be coupled to a DMA controller 764A-764C respectively. For example, one or more of interfaces 762 can be implemented as a Universal Serial Bus (USB) type of interface. One or more of interfaces 762 can be implemented as a gigabit Ethernet type of interface. One or more of interfaces 762 can be implemented as a Secure Digital (SD) type of interface.

The I/O subsystem 750 may also include one or more interfaces 766 such as interfaces 766A-766D that provide a lower level of performance than interfaces 762. For example, one or more of interfaces 766 can be implemented as a General Purpose I/O (GPIO) type of interface. One or more of interfaces 766 can be implemented as a Universal Asynchronous Receiver/Transmitter (UART) type of interface. One or more of interfaces 766 can be implemented in the form of a Serial Peripheral Interface (SPI) bus type of interface. One or more of interfaces 766 can be implemented in the form of a Controller-Area-Network (CAN) type of interface and/or an inter-integrated circuit ($I^2C$) type of interface. One or more of interfaces 766 also can be implemented in the form of a timer type of interface.

The I/O subsystem 750 can include one or more debug interfaces 768 such as processor JTAG (PJTAG) interface 768A and a trace interface 768B. PJTAG interface 768A can provide an external debug interface for the programmable IC 702. Trace interface 768B can provide a port to receive debug, e.g., trace, information from the processor subsystem 710 or the programmable logic subsystem 730.

As shown, each of interfaces 760, 762, 766, and 768 can be coupled to a multiplexer 770. Multiplexer 770 provides a plurality of outputs that can be directly routed or coupled to external pins of the programmable IC 702, e.g., balls of the package within which the programmable IC 702 is disposed. For example, I/O pins of programmable IC 702 can be shared among interfaces 760, 762, 766, and 768. A user can configure multiplexer 770, via a configuration data stream to select which of interfaces 760-768 are to be used and, therefore, coupled to I/O pins of programmable IC 702 via multiplexer 770. The I/O subsystem 750, may also include a fabric multiplexer I/O (FMIO) interface (not shown) to connect interfaces 760-768 to programmable logic circuits of the programmable logic subsystem. Additionally or alternatively, the programmable logic subsystem 730 can be configured to implement one or more I/O circuits within programmable logic. In some implementations, the programmable IC 702 may also include a subsystem 740 having various circuits for power and/or safety management. For example, the subsystem 740 may include a power management unit 746 configured to monitor and maintain one or more voltage domains used to power the various subsystems of the programmable IC 702. In some implementations, the power management unit 746 may disable power of individual subsystems, when idle, to reduce power consumption, without disabling power to subsystems in use.

The subsystem 740 may also include safety circuits to monitor the status of the subsystems to ensure correct operation. For instance, the subsystem 740 may include one or more real-time processors 742 configured to monitor the status of the various subsystems (e.g., as indicated in status registers 744). The real-time processors 742 may be configured to perform a number of tasks in response to detecting errors. For example, for some errors, the real-time processors 742 may generate an alert in response to detecting an error. As another example, the real-time processors 742 may reset a subsystem to attempt to restore the subsystem to correct operation. The subsystem 740 includes a switch network 748 that may be used to interconnect various subsystems. For example, the switch network 748 may be configured to connect the various subsystems 710, 730, and 740 to various interfaces of the I/O subsystem 750. In some applications, the switch network 748 may also be used to isolate the real-time processors 742 from the subsystems that are to be monitored. Such isolation may be required by certain application standards (e.g., IEC-61508 SIL3 or ISO-26262 standards) to ensure that the real-time processors 742 are not affected by errors that occur in other subsystems.

Various modules may be implemented to carry out one or more of the operations and activities described herein and/or shown in the figures. In these contexts, a "module," "engine," or "block" is a circuit that carries out one or more of these or related operations/activities. For example, the modules or engines are discrete logic circuits or programmable logic circuits configured and arranged for implementing these operations/activities, as shown in FIGS. 1, 2, 8, and 11. The programmable circuit can include one or more computer circuits programmed to execute a set (or sets) of instructions (and/or configuration data). The instructions (and/or configuration data) can be in the form of firmware or software stored in and accessible from a memory (circuit).

Though aspects and features may in some cases be described in individual figures, it will be appreciated that features from one figure can be combined with features of another figure even though the combination is not explicitly shown or explicitly described as a combination.

The systems and methods are thought to be applicable to a variety of systems for handling interrupts. Other aspects and features will be apparent to those skilled in the art from consideration of the specification. The systems and methods may be implemented as one or more processors configured to execute software, as an application specific integrated circuit (ASIC), or as a logic on a programmable logic device. It is intended that the specification and drawings be considered as examples only, with a true scope of the invention being indicated by the following claims.

What is claimed is:

1. A system comprising:
a memory circuit, wherein the memory circuit is configured to store a plurality of completion queues, each completion queue having storage for a plurality of completion descriptors associated with transfers of data from a plurality of interrupt source circuits to the memory circuit, and the memory circuit is configured to store a plurality of interrupt aggregation rings, and each interrupt aggregation ring stores a plurality of queue identifiers and associated queue information of the plurality of completion queues;
a direct memory access (DMA) circuit coupled to the memory circuit and configured to provide access to the memory circuit for the plurality of interrupt source circuits;
an interrupt engine coupled to the memory circuit, wherein the interrupt engine is configured to:
in response to a completion message having a queue identifier that identifies a completion queue of the plurality of completion queues and received from an interrupt source circuit of the plurality of interrupt source circuits:
determine one interrupt aggregation ring of the plurality of interrupt aggregation rings associated with the completion queue, and
store the queue identifier and associated queue information in the one interrupt aggregation ring;
issue interrupt messages for processing the completion descriptors in the completion queues in response to satisfaction of a set of trigger conditions specified in an active interrupt moderation mode that is one of a plurality of available interrupt moderation modes; and bypass issuing interrupt messages in response to the set of trigger conditions of the active interrupt moderation mode not being satisfied.

2. The system of claim 1, wherein each completion queue has an associated active interrupt moderation mode of the available interrupt moderation modes.

3. The system of claim 2, wherein the available interrupt moderation modes include a trigger-every mode, and the interrupt engine is configured to issue an interrupt message in response to the active interrupt moderation mode of a completion queue of the plurality of completion queues being the trigger-every mode and input of each completion descriptor to the completion queue.

4. The system of claim 2, wherein the available interrupt moderation modes include a trigger-user mode of the available interrupt moderation modes, and the interrupt engine is configured to:
  issue an interrupt message in response to the active interrupt moderation mode of a completion queue of the plurality of completion queues being the trigger-user mode, a completion descriptor received by the interrupt engine having a code that indicates an interrupt message is to be issued, and input of the completion descriptor to the completion queue; and
  bypassing issuing an interrupt message in response to the active interrupt moderation mode of a completion queue being the trigger-user mode, and a completion descriptor received by the interrupt engine having a code that indicates bypassing the issuing of an interrupt message.

5. The system of claim 2, wherein the available interrupt moderation modes include a trigger-count mode of the available interrupt moderation modes, and the interrupt engine is configured to issue an interrupt message in response to the active interrupt moderation mode of a completion queue of the plurality of completion queues being the trigger-count mode, and a number of unread completion descriptors in the completion queue exceeding a threshold.

6. The system of claim 5, wherein the interrupt engine is configured to issue an interrupt message in response to a completion descriptor received by the interrupt engine having a code that indicates an interrupt message is to be issued, and input of the completion descriptor to the completion queue.

7. The system of claim 2, wherein the available interrupt moderation modes include a trigger-timer mode of the available interrupt moderation modes, and the interrupt engine is configured to issue an interrupt message in response to expiration of a timer.

8. The system of claim 7, wherein the interrupt engine is configured to issue an interrupt message in response to a completion descriptor received by the interrupt engine having a code that indicates an interrupt message is to be issued, and input of the completion descriptor to the completion queue.

9. The system of claim 8, wherein the interrupt engine is configured to issue an interrupt message in response to a number of unread completion descriptors in the completion queue exceeding a threshold.

10. The system of claim 1, wherein the interrupt engine is further configured to issue an interrupt message in response to storing the queue identifier and associated queue information in the one interrupt aggregation ring, and the system further comprising:

a host processor coupled to the memory circuit and to the DMA circuit, wherein the host processor is configured to, in response to the interrupt message from the interrupt engine:
  determine the one interrupt aggregation ring identified by the interrupt message;
  read entries from the one interrupt aggregation ring;
  read entries from the plurality of completion queues identified by the entries read from the one interrupt aggregation ring; and
  process the entries read from the plurality of completion queues.

11. The system of claim 10, wherein:
the associated queue information stored in the one interrupt aggregation ring includes a producer index and a consumer index; and
the host processor is further configured to:
  read consumer indices of the entries in the one interrupt aggregation ring, and
  read entries beginning at the consumer indices from the plurality of completion queues identified by the entries in the one interrupt aggregation ring.

12. The system of claim 1, wherein the interrupt engine includes a reconfigurable memory for storage of data indicating for each completion queue, an active interrupt moderation mode, a counter threshold, a timer value, and an enable/disable interrupt control.

13. A method comprising:
storing a plurality of completion queues in a memory circuit, each completion queue having storage for a plurality of completion descriptors associated with transfers of data from a plurality of interrupt source circuits to the memory circuit;
storing a plurality of interrupt aggregation rings in the memory circuit, wherein each interrupt aggregation ring is configured for storage of a plurality of queue identifiers and associated queue information of the plurality of completion queues;
providing access to the memory circuit by a direct memory access (DMA) circuit for the plurality of interrupt source circuits;
determining by an interrupt engine, in response to a completion message having a queue identifier that identifies a completion queue of the plurality of completion queues and received from an interrupt source circuit of the plurality of interrupt source circuits, one interrupt aggregation ring of the plurality of interrupt aggregation rings associated with the completion queue;
storing the queue identifier and associated queue information in the one interrupt aggregation ring;
issuing interrupt messages by the interrupt engine to a host system for processing the completion descriptors in the completion queues in response to satisfaction of a set of trigger conditions specified in an active interrupt moderation mode that is one of a plurality of available interrupt moderation modes; and
bypassing issuing interrupt messages by the interrupt engine in response to the set of trigger conditions of the active interrupt moderation mode not being satisfied.

14. The method of claim 13, wherein each completion queue has an associated active interrupt moderation mode of the available interrupt moderation modes, and the method further comprising changing an active interrupt moderation mode of one or more of the completion queues by a software driver executing on the host system while the interrupt engine is issuing interrupts.

15. The method of claim 14, further comprising:
issuing an interrupt message by the interrupt engine in response to storing the queue identifier and associated queue information in the one interrupt aggregation ring;
determining by a host processor in response to the interrupt message from the interrupt engine, the one interrupt aggregation ring identified by the interrupt message;
reading entries from the one interrupt aggregation ring by the host processor;
reading entries from the plurality of completion queues identified by the entries read from the one interrupt aggregation ring by the host processor; and
processing the entries read from the plurality of completion queues.

16. The method of claim 15, wherein the associated queue information stored in the one interrupt aggregation ring includes a producer index and a consumer index, and the method further comprises:
reading consumer indices of the entries in the one interrupt aggregation ring by the host processor; and
reading entries beginning at the consumer indices from the plurality of completion queues identified by the entries in the one interrupt aggregation ring by the host processor.

17. The method of claim 13, further comprising storing in a reconfigurable memory accessible to the interrupt engine, data indicating for each completion queue, an active interrupt moderation mode, a counter threshold, a timer value, and an enable/disable interrupt control.

18. The method of claim 13, wherein the available interrupt moderation modes include modes that trigger the interrupt engine to issue an interrupt message in response to one or more conditions including, input of every completion descriptor to the completion queue, a code in a completion descriptor, a count of a number of unread completion descriptors in the completion queue exceeding a threshold, or expiration of a timer.

* * * * *